HIGH-EFFICIENCY MULTIVIBRATOR

Filed Sept. 20, 1963 2 Sheets-Sheet 1

INVENTOR.
ROBERT M. MUÑOZ

BY [signature]

ATTORNEY

Oct. 4, 1966    R. M. MUÑOZ    3,277,314

HIGH-EFFICIENCY MULTIVIBRATOR

Filed Sept. 20, 1963    2 Sheets-Sheet 2

INVENTOR.
ROBERT M. MUÑOZ

BY [signature]

ATTORNEY

United States Patent Office 3,277,314 Patented Oct. 4, 1966

3,277,314
HIGH-EFFICIENCY MULTIVIBRATOR

Robert M. Muñoz, Los Altos, Calif., assignor to the United States of America as represented by the Administrator of the National Aeronautics and Space Administration

Filed Sept. 20, 1963, Ser. No. 310,506
5 Claims. (Cl. 307—88.5)

The invention described herein may be manufactured and used by or for the Government of the United States of America for governmental purposes without the payment of any royalties thereon or therefor.

This invention relates to improved semiconductor multivibrator circuits.

Multivibrator circuits are of three types, namely, astable, bistable or monostable. An astable multivibrator is free-running, that is, self-oscillating. A monostable multivibrator has one stable state of operation and a second quasi-stable state. A trigger pulse applied to a monostable type multivibrator causes the circuit to shift to its quasi-stable state. After a given period of time the monostable multivibrator circuit returns to its stable state. A bistable multivibrator (often referred to as a flip-flop) is a multivibrator in which the two active elements are biased so that the circuit has two stable states and a trigger pulse is required to make a change or switch from one state to the other. The stable states of the bistable multivibrator or the flip-flop are referred to as the set and reset states. This same terminology is used to designate the two pulse inputs of the multivibrator, namely, set input and reset input. The bistable multivibrator has two pulse inputs. The output of the bistable multivibrator is often given the Boolean tags of "one" and "zero." An input pulse at the set input sets the multivibrator and a high output voltage (one) is produced at the output. When an input pulse is applied to the reset input the multivibrator is reset and a low voltage (zero) is produced at the output. Many bistable multivibrators have complementary outputs. That is, a (zero) is available at one terminal at the same time that a (one) is available at another terminal.

In many applications of electronics, the efficient use of power is of relatively little importance but with the advent of satellite instrumentation, power efficiency has become a critical factor. Of the many circuits used in satellite electronics, only a few approach 100 percent efficiency. This invention is one falling within that category.

The nature of the coupling elements between the two active elements in a multivibrator determines whether it is monostable, bistable or astable. The general purpose of the monostable circuit is to produce a rectangular pulse of constant width. The start of the pulse is determined by an input signal (not necessarily periodic) and the pulse width is determined by physical constants within the circuit. Circuits of this type are used widely in the fields of radar, sonar, communications, television, computing and instrumentation. A conventional transistor monostable multivibrator is illustrated in FIG. 1. In this circuit, transistor $Q_1$ is normally cut off and transistor $Q_2$ is normally conducting because of the current that flows through $R_2$ into the base of transistor $Q_2$. Under these conditions, the voltage drop across $R_3$ must be greater than $e_1$ (the potential produced by power supply $E_1$), the base voltage of transistor $Q_1$, to insure that transistor $Q_1$ is cut off. When a negative pulse appears at the collector of transistor $Q_1$, it passes through capacitor $C_1$ to the base of transistor $Q_2$ causing a reduction in current $I_2$ which in turn reduces the voltage drop across resistor $R_3$ to a value less than $e_1$. This action turns transistor $Q_1$ on and positive feedback in the circuit rapidly switches transistor $Q_1$ to saturation and transistor $Q_2$ to cut off.

This condition of saturation remains until resistor $R_2$ charges capacitor $C_1$ thus allowing transistor $Q_2$ to conduct again (the time constant $R_2C_1$ determines the pulse duration). Then the reverse action occurs to return the circuit to its original stable state. While transistor $Q_1$ is conducting, a current $I_1$ flows through resistors $R_1$ and $R_3$. One requirement for stability is that current $I_1$ be less than current $I_2$. The total average power P, consumed by this circuit can be expressed as follows:

$$P=e_2[I_1+(I_2-I_1)(I-tf)]$$

where $t$=pulse duration
$f$=repetition rate and
$e_2$=the potential of the power supply $E_2$.

This represents a very inefficient use of power because much of it is used only to maintain the circuit in readiness and only a small amount is consumed in the load resistor $R_1$, especially if the pulse duration is small. The efficiency, E, of this circuit is given by the following expression:

$$E=\frac{I_1tfR_1}{[I_1+(I_2-I_1)(1-tf)](R_1+R_3)}$$

If $I_1$ and $I_2$ are approximately equal, and if $R_3$ is much less than $R_1$, this equation reduces to:

$$E=tf$$

For low repetition rates and for short pulse durations, this circuit has very low efficiency.

In the circuit of FIG. 1, the output current flows through resistor $R_3$ and causes a voltage drop. The total output voltage is the power supply potential $e_2$ less the saturation voltage of transistor $Q_1$ and the voltage drop across resistor $R_3$.

The purpose of the astable multivibrator is to produce periodic waveforms of high harmonic content, for example, rectangular waveforms, square waves, trapezoids, and pulses. Proper selection of circuit parameters determines the frequency and symmetry of these waveforms. FIG. 2 illustrates a conventional transistor astable multivibrator. In this circuit, the time constants $C_1R_3$ and $C_2R_4$ determine the frequency of operation and the time constants $R_1C_1$ and $R_2C_2$ determine the recovery of the circuit. When transistor $Q_1$ is saturated, transistor $Q_2$ draws no current until capacitor $C_1$ is charged through resistor $R_3$ and transistor $Q_2$ just begins to conduct. The voltage at the collector of transistor $Q_2$ drops and passes through capacitor $C_2$, lowering the base voltage of transistor $Q_1$ and bringing it out of saturation. This allows the collector of transistor $Q_1$ to increase in voltage which increase is coupled through capacitor $C_1$ to the base of transistor $Q_2$, causing positive feedback. The recovery of the collector of transistor $Q_1$ to the voltage $e_2$ (the potential of power supply $E_2$) is limited by the time constant $C_1R_1$ because capacitor $C_1$ is effectively tied to ground through the base of transistor $Q_2$. Collector recovery limits the amount of dissymmetry in the output waveform. If capacitor $C_1$ is made large with respect to capacitor $C_2$ to produce a highly asymmetric output waveform, the time that the collector has to recover to potential $e_2$ is reduced in direct proportion. The efficiency of the circuit is limited in a manner similar to that of the conventional monostable multivibrator shown in FIG. 1 and can be expressed by the same equation used to measure the efficiency of that circuit.

Accordingly, it is an object of this invention to provide an improved semiconductor multivibrator that is substantially 100 percent efficient.

Another object of this invention is to provide an improved multivibrator that produces an output voltage which is nearly equal to the power supply voltage.

A further object of this invention is to provide an improved transistor multivibrator with a shorter response time which allows the shortest possible rise and fall times in the output waveform.

In accordance with the invention, transistors of the opposite conductivity type are coupled in a novel manner to form a multivibrator. The complementary transistors are connected in series with each other and a load resistance. The load resistance is connected to the collector of the first transistor. The emitter of the first transistor is connected directly to the emitter of the second transistor. Current flows in both transistors simultaneosuly, or alternatively, both transistors are cut off. This arrangement produces a nearly 100 percent efficient multivibrator. The series connection of the two complementary transistors results in a reduction in the effective collector shunt capacity and provides a shorter response time. A circuit embodying the invention may be any one of the three types of multivibrators, namely, monostable, bistable, or astable. A single network coupling the complementary transistors determines whether this circuit is monostable, bistable or astable.

The novel features of this invention as well as the invention itself, both as to its organization and method of operation, will be best understood from the following description, when read in connection with the accompanying drawings, in which like reference symbols refer to like parts, in which.

Figure 3:
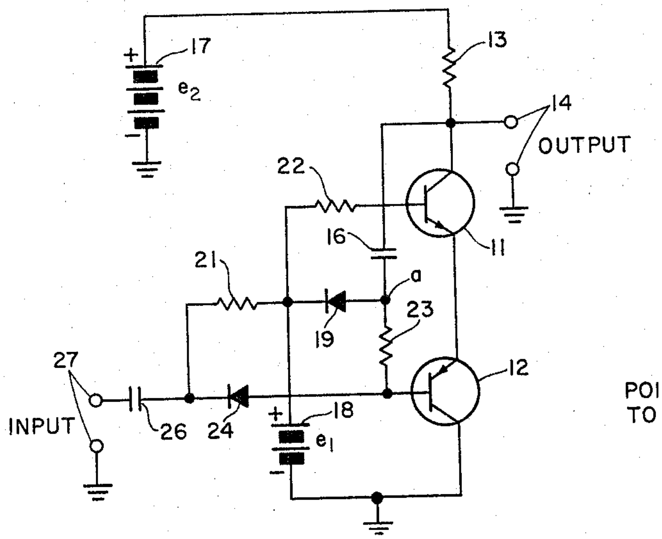
FIG. 3 is a circuit diagram of a monostable multivibrator embodying this invention.

The embodiment shown in FIG. 3 contains a NPN transistor 11, the emitter of which is connected to the emitter of a PNP transistor 12. The collector of transistor 11 is connected to one of output terminals 14, a load resistor 13, and a capacitor 16. The remaining output terminal is grounded. The positive and negative terminals of a power supply 17, generating a potential $e_2$, are connected to resistor 13 and ground, respectively. The negative terminal of a power supply 18, generating a potential $e_1$, is grounded and the positive terminal is connected to the cathode of a diode 19, a resistor 21, and a resistor 22. The anode of diode 19 is connected to capacitor 16 and a resistor 23. Capacitor 16 is connected to the collector of transistor 11 and resistor 23 is connected to the base of transistor 12. Resistor 21 is connected between the cathode of a diode 24 and a coupling capacitor 26. Capacitor 26 and diode 24 are connected in series between one of input terminals 27 and the base of transistor 12. The other input terminal is grounded.

In operation, both transistors 11 and 12 are normally cut off because no voltage appears between the base of transistor 11 and the base of transistor 12. When a negative pulse appears at the input terminals 27, it passes through coupling capacitor 26 and the input diode 24 to the base of transistor 12, causing transistor 12 to conduct. The voltage at the emitter of transistor 11 is reduced since the emitter of transistor 12 is connected to the emitter of transistor 11. This causes transistor 11 to begin conducting. Current then flows through resistor 13 producing positive feedback because of the voltage drop across resistor 13. The circuit quickly saturates and remains saturated until capacitor 16 is discharged through resistor 23 (capacitor 16 and resistor 23 determine the pulse duration) and removes the forward bias current from transistor 12 at which time the reverse action occurs and the transistors switch to the cut-off state. Recovery of the circuit is accomplished when capacitor 16 charges through resistor 13 and diode 19. Some of the circuit waveforms are illustrated in FIG. 4.

Figure 4:
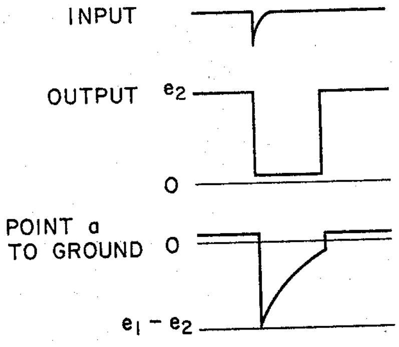
FIG. 4 illustrates waveforms associated with the circuit of FIG. 3.

FIG. 4 illustrates the input waveform, the output waveform, and the waveform between the junction of capacitor 16 and resistor 23, point a, and ground for the circuit depicted in FIG. 3.

Figure 1:
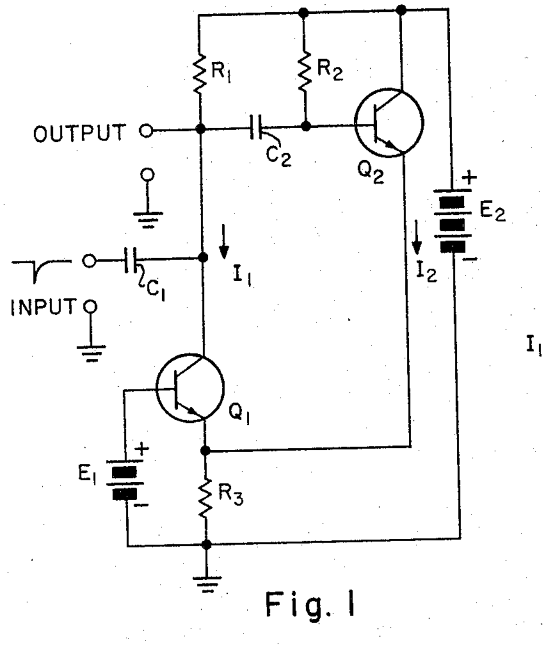
FIG. 1 is a circuit diagram of a conventional semiconductor monostable multivibrator.
Figure 2:
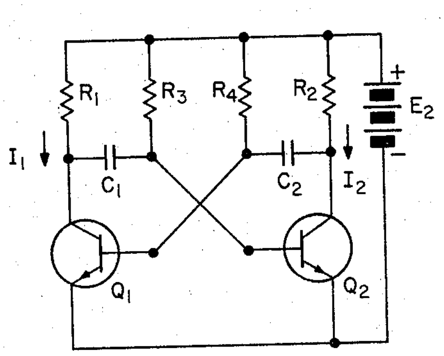
FIG. 2 is a circuit diagram of a conventional transistor astable multivibrator.

In the conventional transistor monostable multivibrator illustrated in FIG. 1, the output current flows through resistor $R_3$ and causes a voltage drop. The total output voltage is the power supply voltage $e_2$ less the saturation voltage of transistors $Q_1$ and $Q_2$ and the voltage drop across resistor $R_3$. In the circuit of FIG. 3, however, the output voltage is equal to the power supply voltage less only the saturation voltages of transistor 11 and 12. This insures pulse height stability and produces a higher output voltage for a given power supply. The output voltage is nearly equal to the power supply voltage. The reduction in the effective collector shunt capacity, by series connection of transistors 11 and 12, contributes to the speed of response of the circuit and allows the shortest possible rise and fall times in the output waveform. The power consumed in the circuit of FIG. 4 is only the power consumed in the load plus the very small power consumed in the base circuit of transistor 12 during switching. Stand-by power is zero. Thus, the circuit is substantially 100 percent efficient. This makes the circuit ideally suited for those applications where power consumption is of the utmost importance, for example, in satellite instrumentation.

Figures 5, 6:
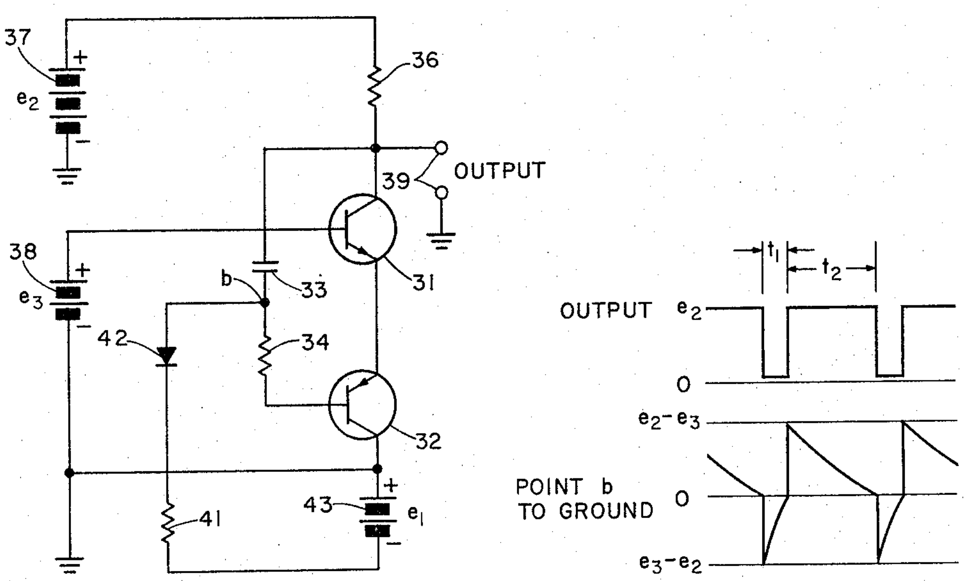
FIG. 5 is a circuit diagram of an astable multivibrator embodying this invention.
FIG. 6 illustrates waveforms generated in the circuit of FIG. 5.

The astable embodiment illustrated in FIG. 5 has no stable states and provides a free-running oscillator. An R-C circuit comprising capacitor 33 and resistor 34 is connected between the base of a PNP transistor 32 and the collector of an NPN transistor 31, the capacitor 33 being connected to the collector of the latter transistor. The emitters of transistors 31 and 32 are directly coupled. The collector of transistor 31 is connected to capacitor 33, a resistor 36 and one of output terminals 39. The other output terminal is connected to ground. The positive and negative terminals of a power supply 37, generating a potential $e_2$, are connected to resistor 36 and ground, respectively. The positive and negative terminals of a power supply 38, generating a potential $e_3$, are connected to the base of transistor 31 and ground, respectively. The anode of diode 42 is connected to resistor 34 and capacitor 33 and the cathode is connected to resistor 41. A power supply 43 is connected between ground and resistor 41, the positive terminal of the power supply being connected to ground. The negative terminal of power supply 38, and the collector of transistor 32 are all grounded.

The circuit shown in FIG. 5 is self-starting and no input pulse is required. Transistors 31 and 32 act similarly to the transistors in the monostable multivibrator circuit of FIG. 3 in that they both are saturated or are both cut off at any given time. When transistors 31 and 32 are saturated, capacitor 33 discharges through resistor 34. Diode 42 is employed as a disconnect diode to isolate capacitor 33 and resistor 34 from resistor 41. Two of the waveforms generated in the circuit of FIG. 5 are ilustrated in FIG. 6. The period $t_1$ during which time transistors 31 and 32 are saturated is regulated by the time constant $R_{34}C_{33}$ wherein $R_{34}$ is the resistance of resistor 34 and $C_{33}$ is the capacitance of capacitor 33. The period $t_2$ during which time the transistor 31 and 32 are cut off is controlled by the time constant $(R_{41}+R_{36})C_{33}$ wherein $R_{41}$ is the resistance of resistor 41. When transistors 31 and 32 are cut off and capacitor 33 is charging, the voltage at the base of transistor 32 is going more negative. As the forward bias is increased, transistor 32 begins to conduct. This causes the emitter voltage of transistor 32 to drop and, accordingly, so does the emitter voltage of transistor 31. Transistor 31 then conducts and a voltage drop is produced across resistor 36 which drop is coupled back to the base of transistor 32 through capacitor 33 and resistor 34. This regenerative action drives transistor 31 and 32 into saturation. The conduction of transistor 31 and transistor 32 results in the discharge of capacitor 33 through resistor 34. The base current of transistor 32 becomes more positive and finally transistor 32 falls out of conduction and transistor 31 does likewise. Once transistors 31 and 32 are cut off, capacitor 33 again charges through diode 42 and resistor 41 and the cycle repeats itself.

Resistor 34 may be made very small and resistor 41 made very large without affecting the circuit adversely, thus permitting a high degree of asymmetry in the multivibrator output. This makes the circuit an ideal generator of pulses. Since current flows through the transistor 31 and 32 only during the interval of output pulse generation ($t_1$), the circuit is nearly 100 percent efficient. The series arrangement of the transistors reduces the effective collector capacity and decreases the rise and fall time of the output waveform.

Figure 7:
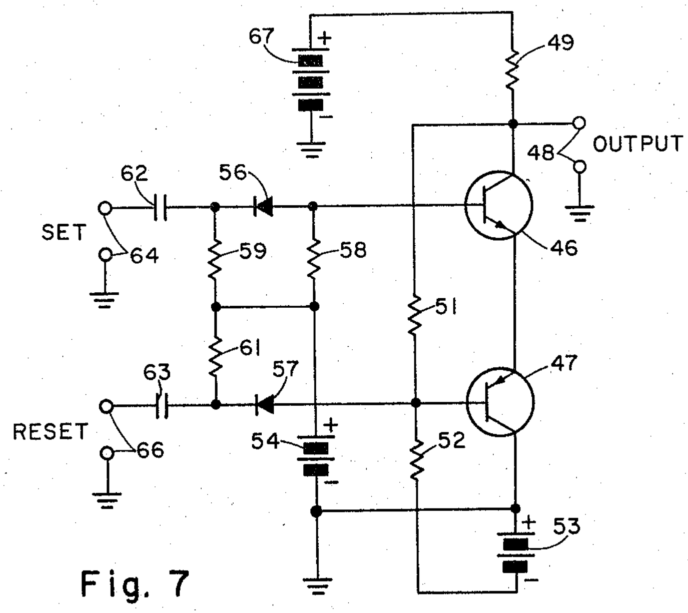
FIG. 7 is a circuit diagram of a bistable multivibrator embodying this invention.

In the bistable embodiment shown in FIG. 7, two complementary transistors 46 and 47 are connected in series. Transistor 46 is of the NPN type and transistor 47 is of the PNP type. The emitters of these transistors are directly coupled together. The collector of transistor 46 is connected to one of output terminals 48, a resistor 49 and a resistor 51. Resistor 51 and a resistor 52 are connected in series between the collector of transistor 46 and the negative terminal of a power supply 53, resistor 52 being connected to the power supply. The positive terminal of power supply 53 is connected to the collector of transistor 46, ground, and the negative terminal of a power supply 54. The positive terminal of power supply 54 is connected to a resistor 58, a resistor 59, and a resistor 61. A coupling capacitor 62 is connected between one of set input terminals 64 and the cathode of a diode 56. The other set input terminal is connected to ground. A coupling capacitor 63 is connected between one of the reset input terminals 66 and the cathode of a diode 57. The other reset input terminal is connected to ground. The anode of diode 56 is connected to the base of transistor 46 and resistor 58. The anode of diode 57 is connected to the base of transistor 47, resistor 51 and resistor 52. The positive and negative terminals of a power supply 67 are connected to resistor 49 and ground, respectively.

In operation, the bistable circuit is in either the reset stable state wherein both transistors 46 and 47 are saturated or in the set stable state wherein transistors 46 and 47 are cut off. When a negative-going input signal is applied to either set of input terminals the circuit switches to the other stable state where it remains until another trigger pulse is applied to the other set of input terminals. Assume that transistors 46 and 47 are cut off and the circuit is in the set stable state. A negative trigger pulse applied at input terminals 66 will be coupled through capacitor 63 and diode 57 to the base of transistor 47. This pulse will increase the forward bias of transistor 47, causing it to conduct and decrease the emitter voltage of transistors 46 and 47. Transistor 46 will likewise conduct, producing a voltage drop across resistor 49. The voltage drop will be reflected back to the base of transistor 47 and the regenerative action will drive transistors 46 and 47 into saturation. The circuit will remain in this stable state (reset) until a negative-going pulse is applied to the input terminals 64. Such a pulse will be coupled through capacitor 62 and diode 56 to the base of transistor 46. The pulse will reverse-bias transistor 46 and drive it into cut off. The positive pulses applied to the emitter and base of transistor 47 will likewise cause that transistor to be cut off. The circuit will then remain in the set stable state until a negative-going pulse is applied to the reset input terminals 66. The series connection of transistors 46 and 47 results in a reduction in the effective collector shunt capacity and results in an output waveform with improved rise and fall times. An improvement in power efficiency may be achieved over that of a conventional bistable multivibrator if the probability of occurrence of the set state is greater than that of the reset state.

There has thus been described a novel transistor multivibrator circuit which may be employed to function either as a monostable, an astable or a bistable element. The multivibrator provides an improved output waveform, improved power efficiency and an improved output voltage amplitude.

Although the invention has been described in considerable detail, it is to be understood that such description is illustrative rather than limiting, as the invention may be variously embodied otherwise than is shown and is to be interpreted only as claimed.

I claim:

1. A multivibrator circuit comprising a first semiconductor device of one conductivity type, a second semiconductor device of another conductivity type, each of said devices including a base electrode, a collector electrode and an emitter electrode, the emitter electrodes of said first and second semiconductor devices being coupled together, a resistor, a power source, said resistor and said power source being series connected and connected between the collector electrodes of said semiconductor devices, biasing means connected between said base electrode of said first semiconductor device and said collector electrode of said second semiconductor device, an R-C circuit connected between said collector electrode of said first semiconductor device and said base electrode of said second semiconductor device, means for coupling said R-C circuit to said biasing means, first and second rectifying means, said first rectifying means being coupled between said biasing means and said R-C circuit, input signal coupling means, said second rectifying means being coupled between said input signal coupling means and said base electrode of said second semiconductor device, and a resistor coupled between said first and second rectifying means.

2. A multivibrator circuit in accordance with claim 1 in which said input signal coupling means includes a coupling capacitor, a pair of input terminals and a pair of output signal terminals connected across said collector electrodes of said semiconductor devices.

3. A multivibrator circuit comprising first and second transistors of opposite conductivity type, said transistors each having a base electrode, a collector electrode and an emitter electrode, said emitter electrodes of said first and second transistors being coupled together, a power supply, a load resistor, said resistor and said power supply being connected in series and connected between said collector electrodes thereby reducing the effective collector capacity, a first biasing means coupled between said base electrode of said first transistor and said collector electrode of said second transistor, a series R-C circuit coupled between said collector electrode of said first transistor and said base electrode of said second transistor, and a second biasing means coupled between the midpoint of said R-C circuit and said collector electrode of said second transistor.

4. A multivibrator circuit according to claim 3, wherein said second biasing means comprises a rectifier, a resistor and a power supply, said rectifier, said resistor and said power supply being connected in series with said resistor being interposed between said rectifier and said power supply.

5. A bistable multivibrator comprising first and second transistors each having base, emitter and collector electrodes, said emitter electrodes of said transistors being coupled together, a first resistor and a power supply connected in series between said collector electrodes of said first and second transistors, a set input, a first diode and a first capacitor coupled between said set input and said base electrode of said first transistor, a reset input, a second diode and a second capacitor coupled between said reset input and said base electrode of said second transistor, a pair of resistors serially connected between the junction of said first diode and said first capacitor and the junction of said second diode and said second capacitor, first biasing means coupled to said pair of resistors, said diodes and said base electrode of said first transistor, second biasing means coupled between said base and collector electrodes of said second transistor, and a resistor coupled between said collector electrode of said first transistor and said base electrode of said second transistor.

References Cited by the Examiner

UNITED STATES PATENTS

| | | | |
|---|---|---|---|
| 3,090,039 | 5/1963 | Walls | 307—88.5 |
| 3,103,595 | 9/1963 | Logue | 307—88.5 |
| 3,113,217 | 12/1963 | Huang et al. | 307—88.5 |
| 3,131,362 | 4/1964 | Dersch | 307—88.5 |
| 3,225,215 | 12/1965 | Winter | 307—88.5 |

ARTHUR GAUSS, *Primary Examiner.*

R. H. EPSTEIN, *Assistant Examiner.*